Jan. 29, 1946. W. BORTOLOTTI 2,393,738
FIXTURE FOR SPREADING MORTAR ON GLASS BLOCKS
Filed Oct. 23, 1944 2 Sheets-Sheet 2
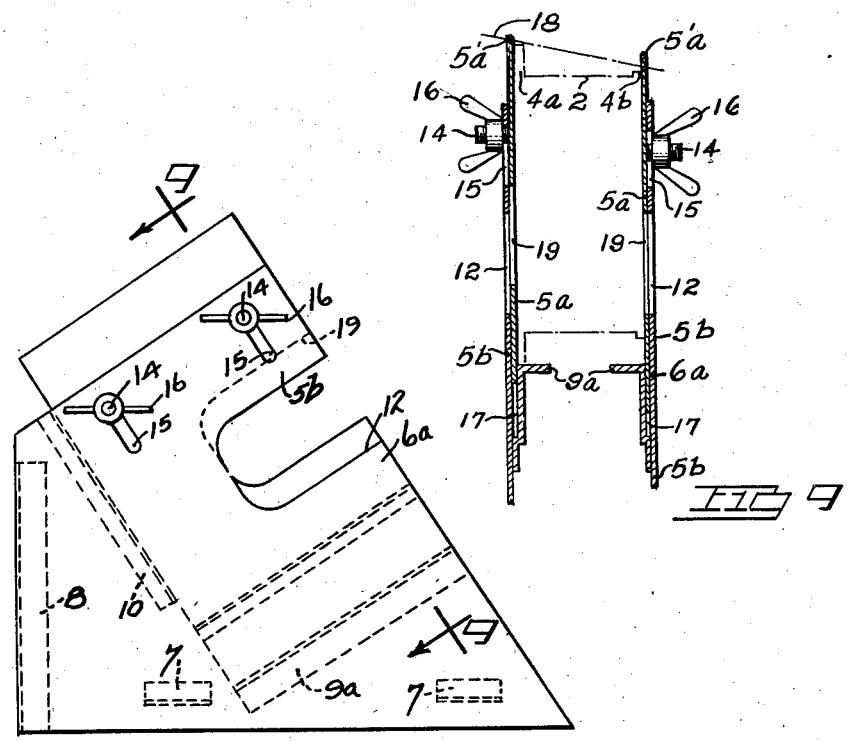
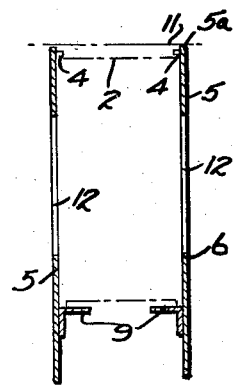
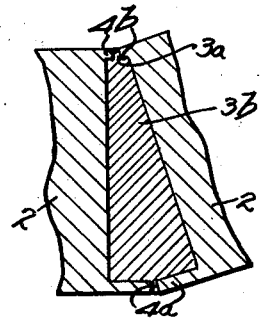
INVENTOR.
William Bortolotti
BY
his Attorney.

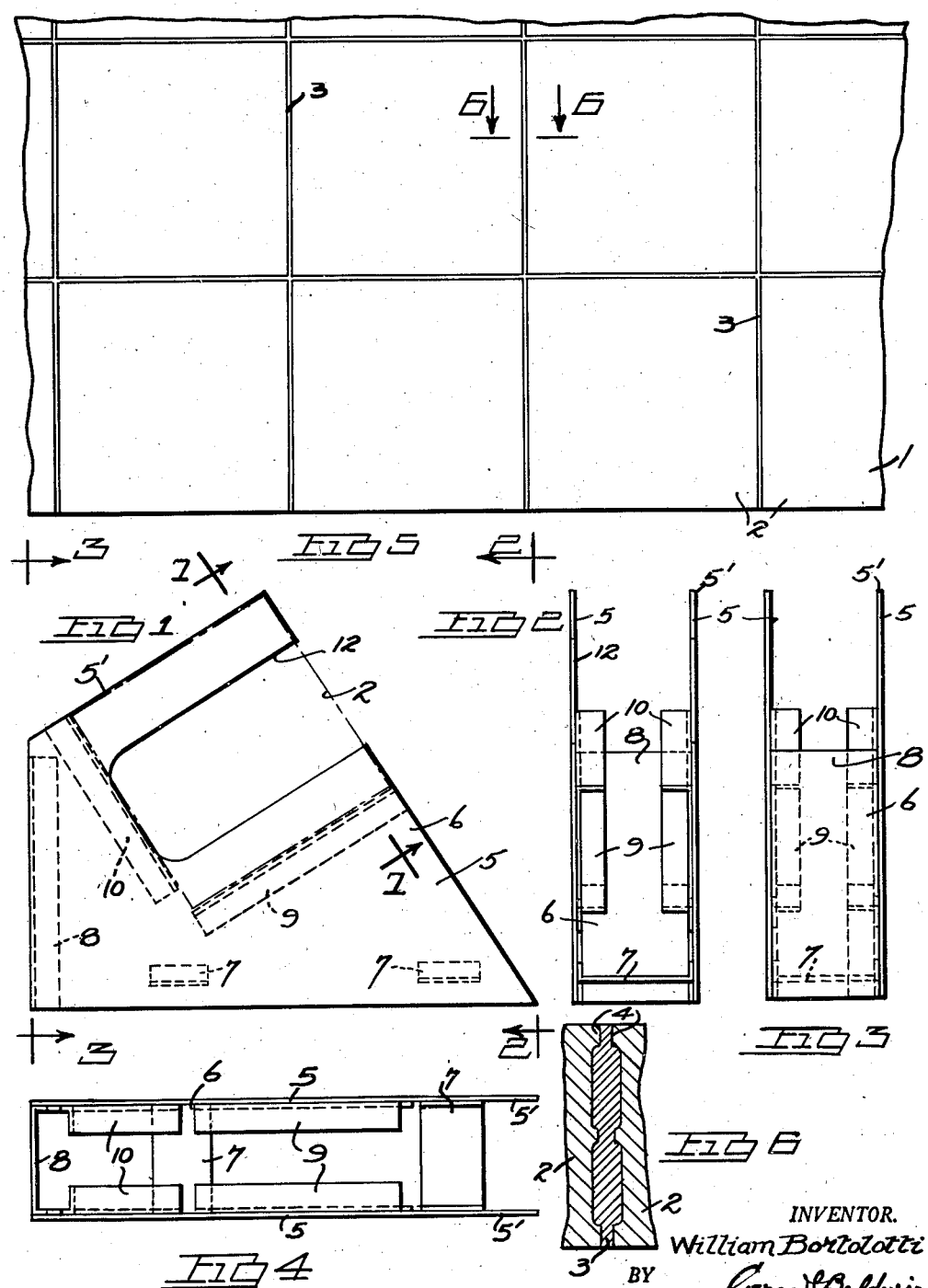

Patented Jan. 29, 1946

2,393,738

UNITED STATES PATENT OFFICE 2,393,738

FIXTURE FOR SPREADING MORTAR ON GLASS BLOCKS

William Bortolotti, Detroit, Mich.

Application October 23, 1944, Serial No. 560,066

6 Claims. (Cl. 91—60)

This invention relates to improvements in fixtures for spreading mortar on glass blocks, and refers particularly to a fixture in which a glass block may be placed to facilitate uniform spreading of mortar upon one edge face of the block.

Due to the fact that glass blocks are water repellant whereas bricks and cement blocks absorb moisture, it is far more difficult to build a wall, or wall section, of glass blocks than of bricks or cement blocks, because a bond is formed between the latter and the mortar as absorption occurs, whereas there is no absorbent action when glass blocks are laid. As the bond created by absorption between mortar and either bricks or cement blocks is lacking in the case of glass blocks displacement of the latter while mortar is setting is very liable to occur, and results in either bulging of the wall or misalignment of the blocks or both. To overcome this tendency many builders only lay a few courses of glass blocks at a time and allow the mortar to set before continuing, but as all moisture in the mortar between glass blocks must be dissipated by evaporation from the front and rear edges long delays are caused by waiting for the mortar to set, much longer in fact than would be required for the setting of mortar joints between bricks or cement blocks by which part of the moisture would be absorbed. It should also be borne in mind that one of the most frequent reasons for using glass blocks is to produce an ornamental appearance, and therefore it is quite important that the width of the mortar joints be uniform and that the blocks be set in both vertical and horizontal alignment.

When laying glass blocks, in order to obtain mortar joints which are both uniform in thickness and solid and watertight throughout their depth, and also to minimize the tendency for the blocks to move after they have been laid, I find that it is necessary to use a very stiff and relatively dry mortar, that is mortar which is far stiffer and dryer than that ordinarily employed when laying bricks or cement blocks. Due, however, to the water repellent properties of glass blocks it is very difficult indeed when using this stiff mortar to make joints which are watertight and uniform as to width, in fact the only practical way is to spread the mortar quite evenly and to a uniform thickness over the entire length and width of one edge face of each block before placing it in position against another.

It is therefore an object of this invention to provide a fixture including two parallel guides spaced to support a glass block between them with the upper margins of the guides projecting above one edge face of the block a distance equal to the thickness of the layer of mortar to be spread upon that edge face. The guides then act as forms to facilitate the spreading operation so that it may be expeditiously and exactly performed with the assurance that all mortar joints will be watertight and of the same thickness.

Another object of the invention is to provide a fixture wherein the upper margins of the guides are inclined, and including a correspondingly inclined base in the fixture to support a block with its upper edge face parallel with and somewhat below the upper margins of the guides, and a stop for limiting the downward movement of the block along the base as it is inserted into the fixture from one side of the latter so that the block will remain stationary against the stop during spreading of mortar thereon.

A further object of the invention is to provide a fixture in one modification of which the spaced guides are separately adjustable for height so that the distance which they project above the top of a block may be set to provide a mortar joint of any desired thickness; or so that the guides may be adjusted to different heights to project an equal distance above flanges of different lengths extending from opposite sides of a block such as those commonly employed for building curved walls.

Having thus stated some of the objects and advantages of the invention I will now describe it in detail with the aid of the accompanying drawings, in which:

Figure 1 illustrates a side elevation of one form of my fixture.

Figures 2 and 3 are end views on the lines 2—2 and 3—3 respectively of Figure 1, and Figure 4 is a plan view.

Figure 5 is a side elevation showing part of a wall built of glass blocks, and

Figure 6 is a section on the line 6—6 of Figure 5.

Figure 7 is a section on the line 7—7 of Figure 1.

Figure 8 is a side view showing a modified form of my fixture, and

Figure 9 is a section on the line 9—9 of Figure 8.

Figure 10 is a sectional view showing a joint between two of the glass blocks commonly employed for building curved walls.

Referring first to Figures 5, 6 and 10, 1 designates a portion of a wall made of glass blocks 2 secured to one another by mortar joints 3. When the wall is straight the blocks employed are provided with vertical flanges 4 which project laterally an equal distance from their front and rear faces as shown in Figure 6. For curved walls it is customary to utilize blocks wherein the front laterally projecting flanges 4a extend farther than the rear flanges 4b as shown in Figure 10, so that when the blocks are laid at an inclination to one another the width of the vertical mortar joints 3a between adjacent pairs of flanges 4a, or 4b, is substantially the same though the width of the mortar joints between these blocks intermediately of the flanges is materially greater toward the front of the wall and decreases toward the back as shown at 3b. When laying blocks of either of these types mortar is usually spread upon the vertical face of one block only to form a joint of the width required between that block and one adjacent thereto.

Referring now to Figures 1 to 4 and 7, the fixture includes a frame 6 having suitable means for retaining opposite vertical sides thereof in spaced parallel relation, in this instance a vertical channel 8 is employed at one end of the frame for this purpose and suitable transverse braces 7 may also be attached to opposite sides of the frame adjacent the bottom thereof. Formed in this case integral with opposite sides of the frame 6 are vertical and parallel guides 5 which are spaced to support opposite sides of a glass block 2. The upper margins 5' of the guides 5, which are in alignment, are downwardly inclined from one extremity toward the end of the frame to which the channel 8 is secured. Supported in the frame between the guides 5 is a base 9 which is also inclined and parallel with the upper margins 5' of the guides. In the present instance this base consists of two angle irons each mounted upon and projecting inwardly from one side of the frame 6. The high end of the base extends to one end of the frame and the low end of the base is inwardly spaced from the channel 8. Mounted in the frame adjacent the low end of the base 9 is a stop 10 which is disposed at right angles to the base and is positioned between the latter and the upper margins 5' of the plates.

A block 2 is inserted into the fixture between the guides 5 from the side of the frame remote from the channel 8, and slides down the base 9 into position against the stop 10. The upper margins 5' of the plates are so positioned above the base 9 that when the lower edge face of the block 2 rests upon the latter the upper edge face of the block lies slightly below and parallel with the upper margins 5'. The guides are then employed as forms to facilitate the spreading of mortar upon the upper edge face of the block 2 with the top of the mortar layer on the line indicated at 11. In order to provide ready means for gripping the block 2 to remove it from the fixture I usually form slots 12 in opposite sides of the frame which extend from the end of the latter into which the blocks are inserted; and when removing the blocks I find it easiest to first insert a trowel or other sharp instrument between the top of the stop 10 and the adjacent end of the block to pry the latter away from the former.

In the modification shown in Figures 8 and 9, the frame 6a again includes sides 5b, braces 7, a vertical channel 8 and a stop 10, and the base 9a is again inclined throughout its length and consists of two inwardly projecting angle irons, but in this instance vertical slots 17 are formed between the sides 5b of the frame and the adjacent ends of the angle irons from the upper extremities of the latter for a portion of their depth. The margins of the sides 5b are in this instance also preferably parallel with the base 9a and formed through these sides are elongated slots 15 extending at right angles to the said base. The guides 5a are in this instance made of separate flat plates which are vertically movable contiguous to the inner faces of the frame sides 5b. The means herein shown for holding the guides at the height required consist of studs 14 projecting outwardly from these plates through the slots 15 and having wing nuts 16 on their outer extremities. In order that a flat bearing face may be provided for each side of a block supported between the guides 5a the lower extremities of the latter extend downwardly into the vertical slots 17, and again the upper margins 5a' of the guides are inclined and parallel with the base 9a. The guides are also preferably provided with openings 19 intermediately of their height which at all adjusted positions of the said plates register at least in part with the slots 12.

The purpose of this modification is twofold. The adjustable guides 5a may be set so that mortar may be spread to any desired depth upon the upwardly projecting edge face of a block 2; or when spreading mortar upon a block having opposite flanges 4a and 4b of unequal length each plate may be set to project slightly above the flange adjacent thereto so that the top of the spread mortar will lie slightly above both flanges as indicated by the line 18.

While in the foregoing the preferred embodiments of the invention have been described it is understood that further alterations and modifications may be made thereto provided they lie within the scope of the appended claims.

What I claim is:

1. A fixture for spreading mortar on glass blocks including a frame having spaced upwardly projecting guides to support opposite sides of a block, a base extending between said guides on which said block is adapted to rest, and a stop mounted adjacent one side of the frame and within the latter between the top of the guides and said base adjacent one end said base to support one edge face of the block, the other end of the frame between the guides being open to permit lateral insertion of said block onto said base.

2. A fixture for spreading mortar on glass blocks including a frame having spaced upwardly projecting guides the upper margins of which are parallel and downwardly inclined from one extremity, a base extending between said guides parallel with the upper inclined margins of the latter, and a stop mounted on the frame at right angles to the base and adjacent the lower end of the latter, said stop being positioned above the base and beneath the top of the guides.

3. The combination set forth in claim 2, wherein the guides are integral with the frame.

4. The combination set forth in claim 2, wherein the guides are vertically adjustable on the frame.

5. A fixture for spreading mortar on glass blocks including a frame having integral vertical guides spaced to receive a glass block and support opposite sides thereof, the upper margins of the guides being downwardly inclined from one extremity and in alignment with one another, a base mounted between the guides parallel with their inclined upper margins to support the bottom of the block with its upper edge face parallel with and slightly below the upper margins of the guides, a stop extending upwardly at right angles to said base from adjacent the lower end of the latter and toward one end of the frame, one edge face of the block being adapted to rest against said stop, and the frame being open between the guides from its other end to permit insertion laterally of the block between the guides and upon said base.

6. A fixture for spreading mortar on glass blocks including a frame, vertically adjustable guides mounted thereon to receive and support opposite sides of a glass block, the upper margins of the guides being inclined, a base extending between the guides parallel with the upper margins of the guides to support the bottom of the block and support said block with one marginal flange parallel with and somewhat beneath the upper margin of each plate, a stop extending at right angles to the base from adjacent the lower end of the latter and toward one end of the frame, and the frame being open between said guides from its other end to permit lateral insertion of the block between the guides and upon the base.

WILLIAM BORTOLOTTI.